Oct. 27, 1936.　　　S. I. COLE　　　2,058,773
ELECTROLYTIC CONDENSER
Filed June 27, 1933　　　2 Sheets-Sheet 2

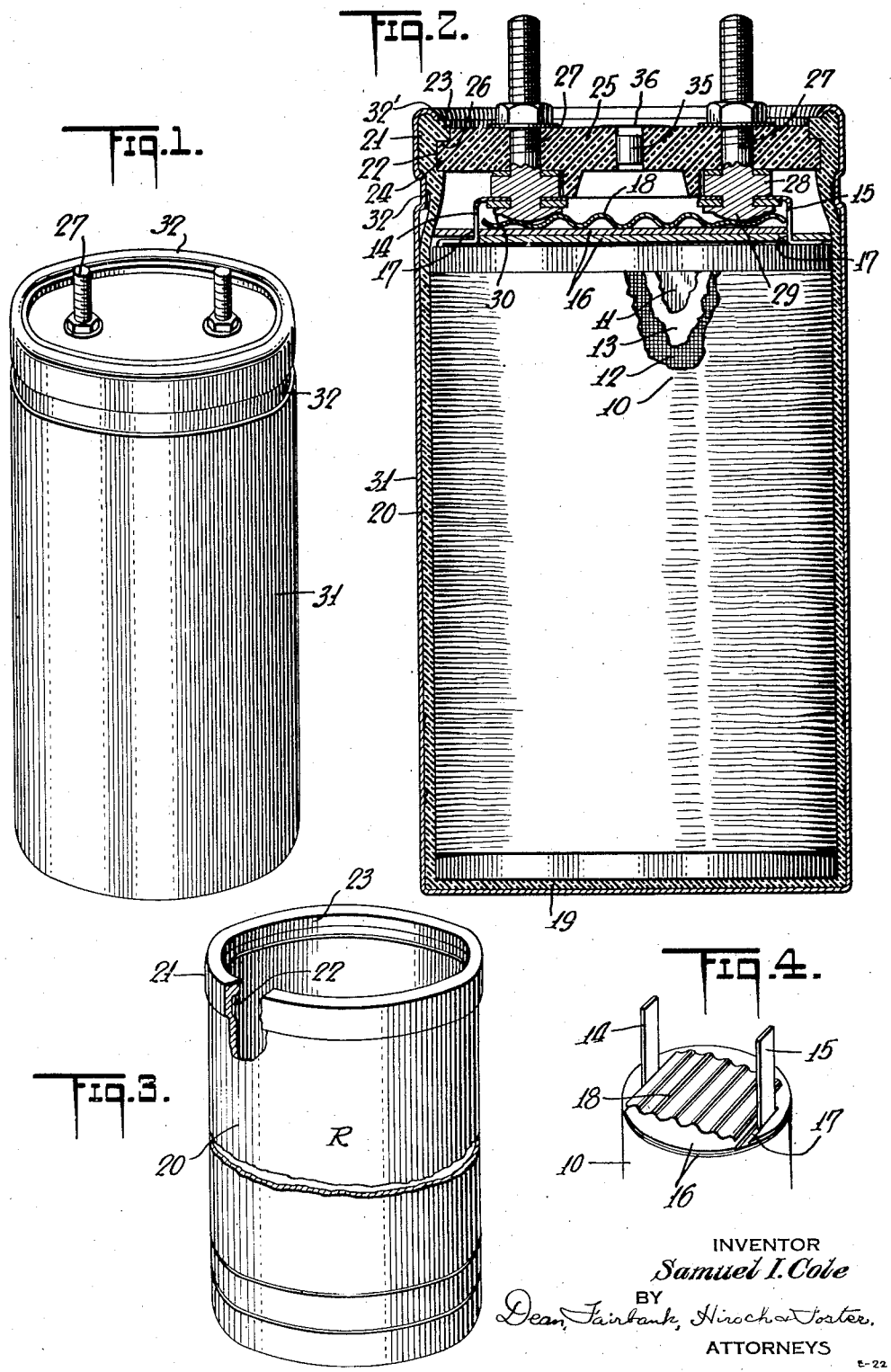

INVENTOR
Samuel I. Cole
BY
ATTORNEYS

Patented Oct. 27, 1936

2,058,773

UNITED STATES PATENT OFFICE 2,058,773

ELECTROLYTIC CONDENSER

Samuel I. Cole, Brooklyn, N. Y., assignor to Aerovox Corporation, Brooklyn, N. Y., a corporation of New York Application June 27, 1933, Serial No. 677,786

10 Claims. (Cl. 175—315)

My present invention relates to electrolytic cells, more particularly to electrolytic condensers and while it has considerable utility as a starting condenser for electric motors, it is not limited to such use.

An object is to provide a condenser of the above type, which admits of having its casing grounded to meet ordinary requirements and yet without the slightest danger of leakage from the enclosed active unit of the condenser, whether the latter be of the so-called dry type devoid of unabsorbed liquid, or of the wet type.

Another object is to accomplish the above results without materially increasing the cost or bulk of a unit devoid of this special utility and without sacrifice of the primary advantages of this type of condenser including high capacity in small bulk, ready rehealing in the event of injury to the dielectric film due to a sudden rush of excessive current, and in the case of the dry type of condenser suitability for mounting in any convenient relation upright, inverted, horizontal, or inclined.

In the accompanying drawings in which is shown one or more of various possible embodiments of the several features of the invention:—

Fig. 1 is a perspective view of the complete unit,

Fig. 2 is a view of the unit in longitudinal cross-section and on a larger scale, Fig. 3 is a perspective view with parts broken away of the rubber liner or cup, Fig. 4 is a perspective view of a fragment illustrating the relation of the terminal tabs.

Figure 5:
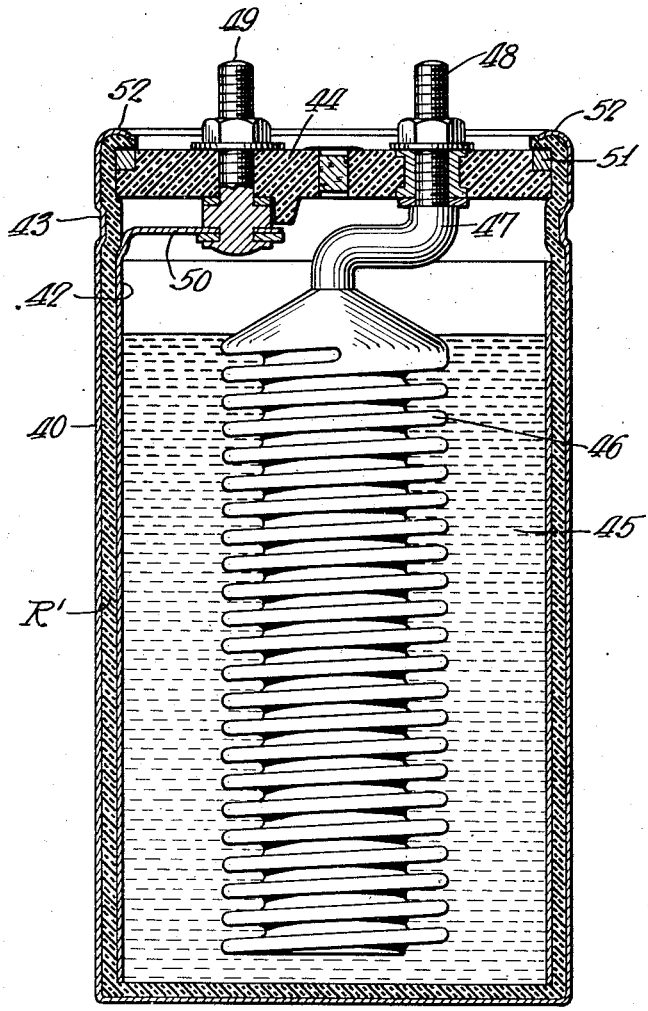
Fig. 5 is a view similar to Fig. 2 of another embodiment.

Referring now to the drawings, there is shown in Fig. 1, the outline of a conventional electrolytic condenser roll, an active unit of the so-called dry type, including electrodes comprising preferably an anode foil 11, a cathode foil 10, intervening absorbent material in the form of a fibrous interlay preferably including a sheet of gauze 12 and a sheet of paper 13, said four elements enrolled together as shown. The electrodes are preferably both of aluminum. The electrolyte which is preferably of the general character of that disclosed in the prior Georgiev Patent No. 1,815,768 of July 21, 1931, is a liquid absorbed and substantially wholly carried by the fibrous interlay, from which the dielectric film on the anode foil may be generated by the usual forming operation. The respective electrodes have terminal tabs 14 and 15 protruding from the upper end of the roll, and these are preferably kept apart by paper or fibrous disks 16 slitted at 17 to straddle the respective tabs. A piece of corrugated paper 18 may also be inserted between the tabs as a further safeguard against contact thereof in the assembled unit.

The condenser unit is preferably closely lodged in an insulating liquid-tight flexible cup, preferably a rubber cup R molded into a single unitary seamless structure having a bottom 19 upon which the lower end of the active roll rests and a side wall 20 snugly encircling the lateral wall of the roll, said cup protruding above the top of the roll. The cup preferably has an outwardly enlarged rim 21 presenting a groove 22 in its inner wall, the rubber being enlarged inward in a shoulder or gasket conformation 23. The groove 22 in the rubber accommodates the rim 24 of a hard insulating cover 25 preferably of vulcanite or "Bakelite", peripherally grooved at 26 to accommodate the shoulder 23 of the rubber cup. Through the cover 25 extend a pair of aluminum screws 27 serving as binding posts, said screws having heads 28, with unitary rivet extensions 29 expanded at 30 over the respective terminal tabs 14 and 15.

The elements thus far described are snugly enclosed in a sheet metal cup 31 preferably of aluminum, which has an inturned bead 32 extending immediately below the rim 21 of the rubber cup and immediately below the cover disk 25. The rim of the can is turned inward at 32' over the shoulder 23 of the rubber cup, to effect a tight gasket closure and to exert pressure through the cover disk 25 against the bead 32 through the intervening material of the rubber cup R.

The electrolyte absorbed in the interlay 12, 13, is retained within the liquid tight insulating enclosure formed by the rubber cup and the insulating cover, so that no electrical leakage to the can can occur as a consequence of any oozing of electrolyte out of the active unit as a result of heating in operation. Accordingly, the two terminals may be connected to the motor in the usual manner and there is no danger of loss of capacity or leakage current due to the usual grounding connection of the can.

Since the condenser is in circuit only for a very short time, at each starting operation of the motor, there is no likelihood of excessive heat evolution, so that even though no special means is provided for facilitating the convection or conduction of heat generated in use, no difficulty is apt to ensue. As a safeguard, however, the cover disk has a small hole therethrough filled with a cork vent plug 35 which is sealed at 36 by the paint over the top of the cover disk.

In the event of excessive over-voltage which might result in the evolution of destructive gas pressure, the plug 35 will act as a relief either by reason of its porosity or by blowing out entirely.

In the embodiment of Fig. 5 the invention is shown as an electrolytic condenser construction of the wet type. In this embodiment the outer can 40 may be aluminum and is shown lined with a flexible cup R', preferably of rubber, as in the embodiment of Figs. 1 to 4. The cathode may comprise a copper shell 42, preferably extending substantially to the level of the bead 43 upon which bead rests the rigid molded insulating cover 44. The electrolyte 45, ordinarily an aqueous solution of borax and boric acid, which may substantially fill the can, would thus rest directly upon the rubber bottom of the cup R'.

The anode 46, which may be of any of various conventional constructions used in wet electrolytic condensers, is illustratively shown as a corrugated tube coaxially of the case and has an offset mounting extension 47 terminating in a bolt 48 through the cover 44. The cathode bolt terminal 49 through the cover 44 is connected at a tab 50 clamped under the head of said bolt and constitutes an integral extension of the copper liner 42.

In the present embodiment a gasket 51 is shown lodged in an annular groove about the molded cover. Preferably some rubber cement is applied to the top face of the gasket, and the rim 52 of the outer metal shell 40 when turned over, as shown, causes the rim of the rubber cup to be pressed down and bonded to the gasket.

It will be understood that the arrangement disclosed for bonding a plain rubber cup to a separate gasket might be utilized to advantage in the type of construction shown in Figs. 1 to 4 and conversely the arrangement of the latter embodiment could be used to advantage in the embodiment shown in Fig. 5.

It will also be understood that in the case of both embodiments the rubber cup instead of being separately fabricated may be formed by a deposition process in situ direct upon the inner surface of the outer container, and in the case of the embodiment of Fig. 5, the copper cathode shell could, if desired, be formed by electrodeposition upon the inner face of the rubber liner.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made, without departing from the scope thereof, it is intended that all matter contained in the above description or shown in the accompanying drawings shall be interpreted as illustrative and not in a limiting sense.

Having thus described my invention what I claim as new and desire to secure by Letters Patent of the United States is:

1. An electrolytic condenser comprising a metal can, an insulating rubber lining cup within said can, an insulating rigid cover for said can in clamping engagement with respect to the rim of said cup, an anode within said can having a terminal protruding through said cover, a cathode within said can substantially enclosing said anode and substantially in contact with said rubber lining, said cathode having a terminal protruding through said can, and an electrolyte within said rubber liner and adapted to directly contact the exposed bottom of said rubber liner.

2. An electrolytic cell of the dry type, comprising an active unit having electrolyte incorporated therein, a liquid-tight seamless flexible insulating container therefor, a metallic container snugly encircling said insulating container, a rigid insulating cover carrying the terminals of said active unit, said insulating container presenting a shoulder below its rim engaged by the rim of said cover, said metallic container crimped over said cover and over the rim of said flexible container.

3. An electrolytic condenser comprising a cylindrical condenser roll having electrodes and an absorbent interlay, electrolyte incorporated in the latter, a rubber cup containing said condenser roll and having an enlarged rim, a rigid insulating cover disk having a groove accommodating said rim and having terminals for said electrodes, said rubber cup presenting a circumferential groove in its inner wall engaged by the rim of said cover disk and a can snugly enclosing said rubber cup and having its rim crimped over about the enlarged rim of said rubber cup.

4. An electrolytic condenser comprising an active condenser roll including a pair of sheet metal electrodes, at least one of which is of film-forming metal, a fibrous interlay therebetween having electrolyte absorbed therein, a rubber cup snugly enclosing said unit, said cup having an enlarged rim, a metal can snugly enclosing said rubber cup, and presenting a peripheral inturned bead under said enlargement, a rigid insulating cover carrying terminals for said electrodes, and presenting a peripheral groove accommodating the enlarged rim of said rubber cup, the rim of said can turned inward over the rim of said rubber cup as a gasket, the bead of said metal cup serving as a support for said cover, said rubber cup presenting an inner shoulder adjacent said bead, engaged by the periphery of said cover.

5. An electrolytic condenser comprising an active unit including electrode foils, an intervening absorbent member having electrolyte absorbed therein, a flexible rubber cup enclosing said unit, an insulating rigid cover having its rim in a corresponding groove in said cup, the rim of said cup enlarged and extending into a corresponding groove in said cover, said cover having binding posts and said electrodes having tabs secured to said respective binding posts, a sheet metal can snugly enclosing said cup and said cover, the rim of said can turned inward over the enlarged rim of said rubber cup and effecting a complete hermetically tight insulating enclosure completely housing said active unit, said cover having a normally sealed vent plug therein to relieve excess pressure.

6. An electrolytic cell comprising a metal container, an insulating liner therefor in snug engagement with the entire face of said container, a rigid insulating cover for said container, said liner presenting a shoulder below its rim engaged by the rim of said cover, an anode and a cathode within said container having terminals exposed at said cover, an insulating gasket exposed at the upper face of said cover, the rim of said can turned inward for snug engagement of the insulating liner thereof with said gasket.

7. An electrolytic cell comprising a metal container, a rubber liner therefor in snug engagement with the entire face of said container, a rigid insulating cover for said container, an anode and a cathode within said container having terminals exposed at said cover, a rubber gasket exposed at the upper face of said cover, the rim of said can turned inward for snug engagement of the rubber liner thereof with said gasket, there being rubber cement interposed between the gasket and the rim of the rubber cup to effect a unitary bond therebetween when the rim of the can is turned over, as set forth.

8. An electrolytic condenser comprising a sheet metal can, a rubber liner formed on the inner surface thereof, a cathode, an anode, and an electrolyte within said container and insulated therefrom by said liner, said can and liner having a bead near the rim thereof, and an insulating cover resting on said bead and having terminals for said anode and cathode.

9. An electrolytic condenser comprising a sheet metal can, a rubber liner formed on the inner surface thereof, a cathode, an anode, and an electrolyte within said container, and insulated therefrom by said liner, said can and liner having a bead near the rim thereof, an insulating cover resting on said bead and having terminals for said anode and cathode, and a rubber gasket lodged in a corresponding groove about said cover, the rim of said can turned inward to bring the rubber liner portion thereof into intimate engagement with the exposed face of said gasket.

10. An electrolytic condenser comprising an aluminum can, a rubber liner in snug engagement with the entire inner surface thereof, a copper shell snugly engaging the inner lateral wall of said rubber liner, a rigid insulating cover for said lined can, an anode supported from said cover and having an exposed terminal, a negative terminal through said cover electrically connected to said copper shell and fluid electrolyte contained in said rubber liner and substantially submerging said anode.

SAMUEL I. COLE.